Figure 1:
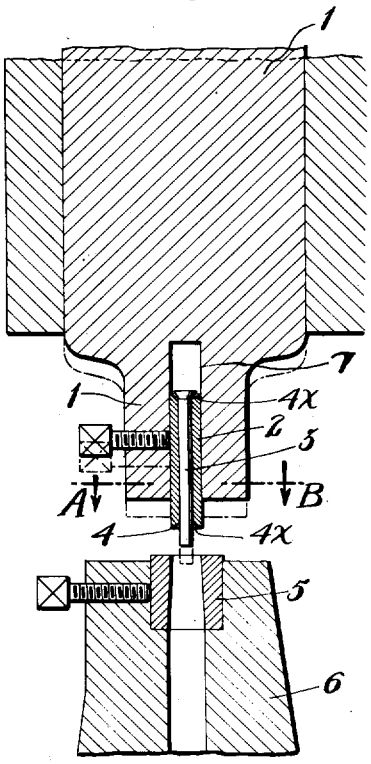

T. H. WILSON.

STAMPING MACHINE FOR CUTTING OUT ARTICLES FROM SHEET METAL.

APPLICATION FILED JUNE 4, 1921.

Reissued July 4, 1922. 15,402.

Thomas Henry Wilson Inventor

By Frederick S. Duncan Attorney

UNITED STATES PATENT OFFICE.

THOMAS HENRY WILSON, OF BRAMLEY, LEEDS, ENGLAND.

STAMPING MACHINE FOR CUTTING OUT ARTICLES FROM SHEET METAL.

15,402. Specification of Reissued Letters Patent. Reissued July 4, 1922.

Original No. 1,320,189, dated October 28, 1919, Serial No. 300,381, filed May 28, 1919. Application for reissue filed June 4, 1921. Serial No. 475,174.

*To all whom it may concern:*

Be it known that I, THOMAS HENRY WILSON, a subject of the King of Great Britain, residing at Aero Metal Works, Bramley, Leeds, in the county of York, England, have invented certain new and useful Improvements in Stamping Machines for Cutting Out Articles from Sheet Metal, and of which the following is a specification.

In the cutting out of articles in the flat from sheet metal plates by means of stamping machines, dies of a contour corresponding to that of the article to be cut have been employed for stamping out the article at one blow; but as a fresh set of dies is required for each differently shaped article to be cut, the cost of working under this method is very considerable. It has also before been proposed to fit the stamping machine with a punch or cutting tool with a view to roughly nibbling off the metal of the plate to the approximate shape of the article required; but the arrangement employed has been such as to only allow the nibbling to be effected in a more or less straight line, with the result that considerable chipping and filing had to be put in afterward in order to bring the article to the finished state.

One object of the present invention is to provide the machine with a punch or cutting tool of a construction which will enable the metal plate to traverse under the punch in any direction at will either by motion of translation or motion of rotation, as desired, the arrangement being such that, by using a templet on the plate, say by clamping or otherwise attaching the two together, the article according to the templet can be cut out from the plate in a speedy and efficient manner by the nibbling action of the tool so as to necessitate only a very slight filing up of the article afterwards. In describing the use of the tool in combination with a templet, I am only describing a more or less frequent method of use, it being understood that the line of cutting may be made to follow a marking if desired. According to my invention as I show it in the drawings and which is to be regarded as only one of a number of possible embodiments thereof, I employ a tubular punch or cutting tool fitted with a central pin which is depending below its base or cutting edge for a suitable distance, and the said tool is mounted in the vertically recriprocating slide of the stamping machine in the ordinary way and is adapted to work in conjunction with the usual stationary circular die provided on the bed-plate of the machine, so that, on a sheet of metal with a templet or design attached thereto being passed under the punch or cutting tool, the edge of the metal plate always encounters the central pin of the cutting tool so as to prevent the plate being pushed under the tool too far and at the same time insure the cutting action of the tool being perfectly uniform.

In employing this arrangement, the central pin of the tool acts as a stop against which the edge of the plate may be caused to bear so that the said plate can be traversed against the pin an any direction, the pin acting either as a stop or as a combined stop and fulcrum accordingly as it is desired in the particular instance to move the work by motion of translation or motion of rotation; by causing the tool to recriprocate rapidly, the cutting out operation can be speedily and expeditiously performed by the rapid nibbling action of the tool. The tubular punch or cutting tool is preferably made with a cutting edge at each end thereof so as to enable the same to be reversed at will, and by making the said cutting edges in the form of a concave recess a gripping action is imparted to the tool which prevents the plate slipping back when effecting the cut.

The central pin may be loosely mounted in the tubular cutting tool so as to enable the two parts to be tempered differently to suit the work they are required to perform.

In order that the invention may be clearly understood I will proceed to describe the same with reference to the example of construction shown in the accompanying drawings wherein Figure 1 is a sectional elevation of a portion of a stamping machine, fitted with a punch or cutting tool constructed in accordance with my invention.

Figure 2:
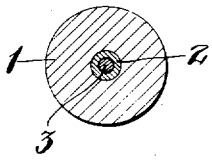

Figure 2 is a sectional plan view taken on the line A—B of Figure 1.

In the form of my invention as shown, the vertically reciprocating silde 1 of the machine is fitted with a tubular punch or cutting tool 2 having a central pin 3 depending below its base 4 and adapted to work in conjunction with the usual stationary circular die 5 carried on the bed-plate 6 of the machine, the central pin 3 being in this instance loosely mounted in the tubular cutting tool 2 which is formed with a cutting edge 4x, at each end thereof, so as to enable the said tool 2 to be reversed at will. By making the central pin separate from the cutting tool, each may be more easily tempered to suit its own particular requirements than if the pin were made integral with the cutting tool.

The metal plate to be cut is passed into position when the cutting tool 2 is in the position shown in full lines in Figure 1; after which the slide 1 is lowered so as to bring the cutting tool 2 into the position shown in dotted lines in Figure 1, the central pin 3 of the said tool 2 passing down through a hole previously formed in the plate. This dotted position is the top center position of the slide 1 which is now rapidly reciprocated so as to cause the tool 2 to effect the cutting out operation, the plate under treatment being pushed against the center pin in such direction that the tool follows the necessary course to cut on the particular line desired. As the pin is always interposed in the path of movement of the plate when the punch is clear of the plate it is impossible to force the plate for more than a predetermined distance following each descent of the punch.

It will thus be seen that the central pin 3 of the cutting tool 2 acts as a stop against which the edge of the plate is caused to bear so that the said plate can be traversed around the tool 2 or forced against the tool 2 in any direction, whereby the cutting out operation is rendered capable of being speedily and expeditiously performed by the rapid nibbing action of the tool.

The cutting edges 4x of the reversible tool 2 are made by forming the said tool 2 with a concave recess at each end thereof whereby a gripping action is imparted to the tool 2 sufficient to prevent the plate slipping back when effecting the cut.

In the construction shown in Figure 1 it will be noted that the depth of the hole 7 in which the punch is carried is such that neither the punch nor the central pin are seated at the bottom thereof. This construction possesses some advantage in that in piercing the initial hole within the confines of a plate the pin will be driven upward with the descent of the punch but when the initial hole has been pierced the pin will drop to its lowest position and thereafter act as a stop in the manner above described.

Having thus described my invention and with the knowledge that changes and modifications may be made which are within the powers of the ordinary skilled mechanic, all of which I claim, what I claim as my invention and desire to secure by Letters Patent is:—

1. In a stamping machine for cutting out articles in the flat from sheet metal plates, the combination with a vertically reciprocating slide and a circular die, of a tubular punch or cutting tool carried by said vertically reciprocating slide, and a central pin depending below the base of the said tubular punch or cutting tool and being adapted to work in conjunction with the said circular die of the machine.

2. In a stamping machine for cutting out articles in the flat from sheet metal plates, the combination with a vertically reciprocating slide and a stationary circular die, of a tubular punch or cutting tool carried by the said vertically reciprocating slide, and a central pin mounted loosely in the said tubular punch or cutting tool and depending below the base thereof, the said loosely mounted central pin being adapted to work in conjunction with the stationary circular die of the machine.

3. In a stamping machine for cutting out articles in the flat from sheet metal plates, the combination with a vertically reciprocating slide and a stationary circular die, of a tubular punch or cutting tool formed with a cutting edge at both ends thereof and being carried by the said slide, and a central pin mounted to slide in the said tubular punch or cutting tool and depending below the base thereof, the said central pin being adapted to work in conjunction with the stationary circular die of the machine.

4. In a machine for cutting sheet material, a punch adapted for reciprocatory action, a spindle co-axial with said punch, and means for causing said spindle to be interposed in the path of feed of material being cut when the punch is clear of the said material.

5. In a machine for cutting sheet material, a reciprocating circular punch, a spindle, means for interposing said spindle in the path of the material being cut, and in a position co-axial with said punch when the punch is clear of the material.

6. In a machine for cutting sheet material, a reciprocating circular punch, a spindle projecting from said punch and co-axial therewith, said spindle projecting a sufficient distance therefrom to be interposed in the path of the material being cut when the punch is in its retracted position.

7. In a machine for cutting sheet material, a reciprocating circular punch, a central pin projecting from said punch and co-axial therewith, said spindle projecting a sufficient distance therefrom to be interposed in the path of the material being cut when the punch is in its retracted position.

8. In a machine for cutting sheet material, a punch adapted for rapid, continuous, reciprocatory action, a spindle co-axial with said punch and means for causing said spindle to be interposed in the path of feed of material being cut when the punch is clear of said material.

9. In a machine for cutting sheet material, a cutting tool circular in cross-section and adapted for rapid, continuous, reciprocating motion, a spindle and means for interposing said spindle in the path of movement of the material being cut and in a position co-axial with said cutting tool when the cutting tool is clear of the material.

10. In a machine for cutting sheet material, a cutting tool circular in cross-section and adapted for rapid, continuous, reciprocatory motion, a spindle co-axial with said punch, means for causing said spindle to be interposed in the path of feed of material being cut when the punch is clear of the material, the working face of said cutting tool being concave.

11. In a machine for cutting sheet material, a circular punch adapted for rapid, continuous, reciprocatory motion, a spindle projecting from said punch and co-axial therewith, said spindle projecting a sufficient distance therefrom to be interposed in the path of the material being cut when the punch is in its retracted position, said spindle being of sufficient strength and rigidity to withstand the pressure of the work when being fed by hand, and the working face of said punch being concave.

THOMAS HENRY WILSON.